(12) United States Patent
Fox

(10) Patent No.: US 6,491,331 B1
(45) Date of Patent: Dec. 10, 2002

(54) EXTENDABLE CARGO DECK FOR PICKUP TRUCKS

(75) Inventor: Daniel B. Fox, Olmsted Falls, OH (US)

(73) Assignee: Ted-Dan, Ltd., Wickliffe, OH (US)

( * ) Notice: Subject to any disclaimer, the term of this patent is extended or adjusted under 35 U.S.C. 154(b) by 0 days.

(21) Appl. No.: 09/870,290

(22) Filed: May 30, 2001

(51) Int. Cl.$^7$ ............................................... B62D 33/02
(52) U.S. Cl. .................... 296/26.09; 414/522; 224/403; 224/496; 224/510
(58) Field of Search ......................... 296/26.08, 26.09, 296/26.1, 26.11, 37.6; 414/522; 410/121, 143, 151; 224/496, 510, 403, 404

(56) References Cited

U.S. PATENT DOCUMENTS 4,993,088 A * 2/1991 Chudik ................ 296/26.09 X
5,118,156 A * 6/1992 Richard ................. 296/37.6 X
5,136,953 A   8/1992 Schmidt
5,603,439 A   2/1997 Pineda
5,820,190 A  10/1998 Benner
5,845,953 A * 12/1998 Rusnock .................... 296/37.6
5,897,138 A * 4/1999 Hall ..................... 296/37.6 X
6,120,075 A   9/2000 Terry
6,312,034 B1 * 11/2001 Coleman, II et al. . 296/26.09 X

* cited by examiner

Primary Examiner—Dennis H. Pedder
(74) Attorney, Agent, or Firm—Renner, Otto, Boisselle & Sklar, LLP

(57) ABSTRACT

An extendable cargo deck for pickup trucks having a rearwardly opening cargo bed bounded by side walls having inwardly projecting rails spaced above the floor of the cargo bed. The cargo deck includes a base and a carriage mounted to the base for movement between a retracted position and an extended position with respect to the base. The cargo deck is equipped with one or more upwardly extending holding devices connected to the base for engaging the side wall rails.

20 Claims, 8 Drawing Sheets

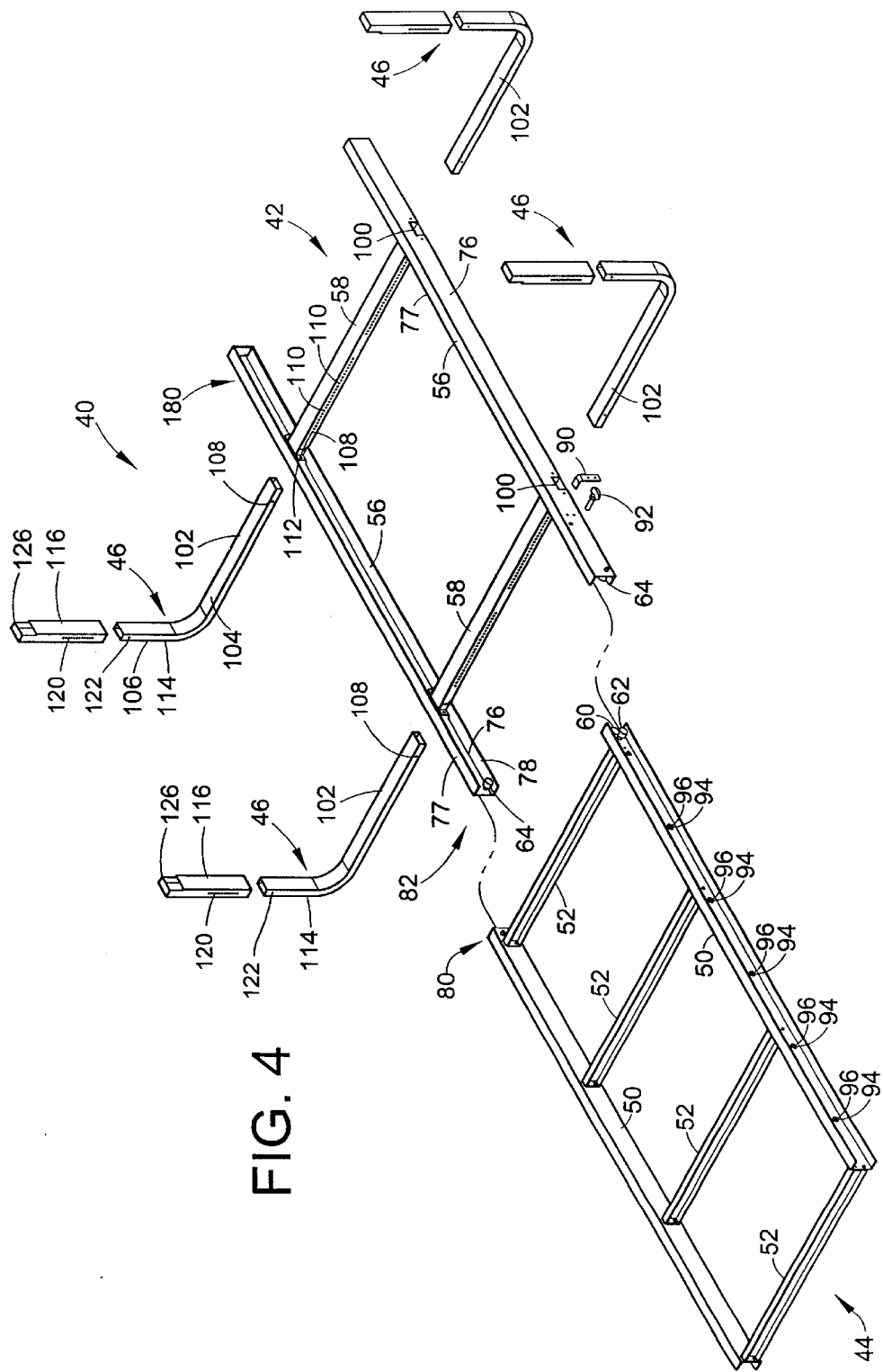

EXTENDABLE CARGO DECK FOR PICKUP TRUCKS

FIELD OF THE INVENTION

The present invention relates to a cargo deck for a pickup truck, and more particularly to a cargo deck for a pickup bed that slides out of the pickup truck bed.

BACKGROUND OF THE INVENTION

Pickup trucks generally are designed to carry large loads in the cargo box or bed of the truck. The cargo box is oftentimes equipped with a truck bed liner to protect painted metal surfaces of the truck bed from the weather and/or damage during loading, unloading and/or transport of cargo, and/or to cover surfaces that already have been damaged.

Access to the truck bed is somewhat obstructed by the side walls of the truck bed, bumpers, tailgates and trailer hitches. These obstructions often require a person to bend over, reach and/or climb into the truck bed for loading or unloading purposes. This can reduce a worker's performance due to fatigue and ergonomically stressful motions and positions performed in unloading and loading the truck. The obstructions around the sides of the truck bed also present problems in providing access for forklift trucks to load and unload cargo in and from the truck bed.

The aforesaid obstructions also make it difficult to access equipment carried in the truck bed. Consequently, the equipment may have to be removed from the truck bed for use. Heretofore, U.S. Pat. No. 5,820,190 proposed using a track bed extending system including a worktable that can be slid out from the bed of a pickup truck to allow access to tools and supplies carried on the table. This system, however, appears to require the use of invasive fasteners that require holes to be drilled in the floor of the cargo bed at the time of installation and which may be difficult to install. Holes presumably would also have to be drilled in any truck bed liner installed in the truck bed. The holes in the truck bed and/or liner may adversely affect the utility and/or resale value of the truck. Moreover, no apparent provision is made for accommodating different widths of truck beds associated with the variety of pickup trucks being manufactured today.

SUMMARY OF THE INVENTION

The present invention provides an extendable cargo deck for pickup trucks or other vehicles having a rearwardly opening cargo bed which is bounded by side walls having inwardly projecting rails spaced above the floor of the cargo bed (which would be the floor of a bed liner if a bed liner is used in the cargo bed). The cargo deck includes a base and a carriage mounted to the base for movement between a retracted (or stowed) position and an extended position with respect to the base. The base is equipped with one or more upwardly extending holding devices for engaging the side wall rails. This arrangement eliminates or minimizes the need to drill holes in the truck bed and/or truck bed liner, and otherwise enables easy and simple installation and use. In most situations where a bed liner is used, the cargo deck is installed noninvasively, eliminating the need to drill holes in the bed liner in order to install the cargo deck. Consequently, the cargo deck can be easily moved from one truck bed to another. The installation and use of the cargo deck also may preserve any warranties that may be in effect for the bed liner and/or the truck bed.

According to a preferred embodiment, each holding device includes an upwardly extending arm for engaging the side wall rail. The height of the arm preferably is adjustable for tightly engaging the side wall rail and reactively urging the cargo deck base against the floor of the cargo bed. Preferably the base and/or holding devices thereof include telescoping members which allow the spacing between the upright arms on opposite sides of the base to be adjustably varied for different sizes of cargo beds. That is, the upright arms on opposite sides of the base can be adjustably moved towards and away from one another to position the upright arms beneath the side rails of the cargo bed into which the cargo deck is being installed. Once in the proper position, the upright arms can be vertically extended and engaged against the side rails, thereby holding the cargo deck in the cargo bed.

The carriage generally has a platform surface provided therewith or is equipped with means by which a platform, such as a sheet of plywood, can be mounted thereto. The carriage can be extended out of the truck bed to provide easy access to the cargo carried thereon. Preferably, the carriage, base and holding devices each are substantially planar, providing a further advantage in that they can be laid flat for compact storage and/or shipping. Additional productivity-enhancing accessories may be used with the carriage and/or platform, including racks, ramps, sliding work tables, tool box holders, ladder racks, lumber holders, bike racks, grocery bag holders, sport equipment holders, clothes hangers, hold-down brackets, etc.

As will be appreciated, various other advantages are provided by various embodiments of the present invention. The aforesaid construction of a cargo deck provides for the installation of the cargo deck without interference with rail-mounted work boxes and/or truck caps, as may be desired. Heavy equipment, such as welders, saws and compressors can be accessed and stowed with significantly less effort, and loading and unloading of the truck bed can be accomplished much more easily. Furthermore, the cargo deck can increase worker productivity by allowing access to the truck bed cargo volume quickly and conveniently, thereby reducing the human performance barrier caused by fatigue and ergonomically stressful motions/positions. The cargo deck may have a wide variety of applications, including use in delivery trucks, as tool supports for the construction trades, general use by a handyman, etc. The cargo deck also may be outfitted with collapsible support legs to form a temporary work table.

In addition, a cargo deck can be installed in a relatively short time, on the order of minutes, without special tools or prior knowledge of trucks. The components of the cargo deck may also be lightweight, and can be installed and used by both men and women. Despite its light weight, the cargo deck may be very strong and generally may be capable of handling loads near the duty-rating of the truck.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

BRIEF DESCRIPTION OF THE DRAWINGS

FIG. 4 is an exploded view of the cargo deck illustrating the various components and assembly of the cargo deck.

DETAILED DESCRIPTION

Figure 1:
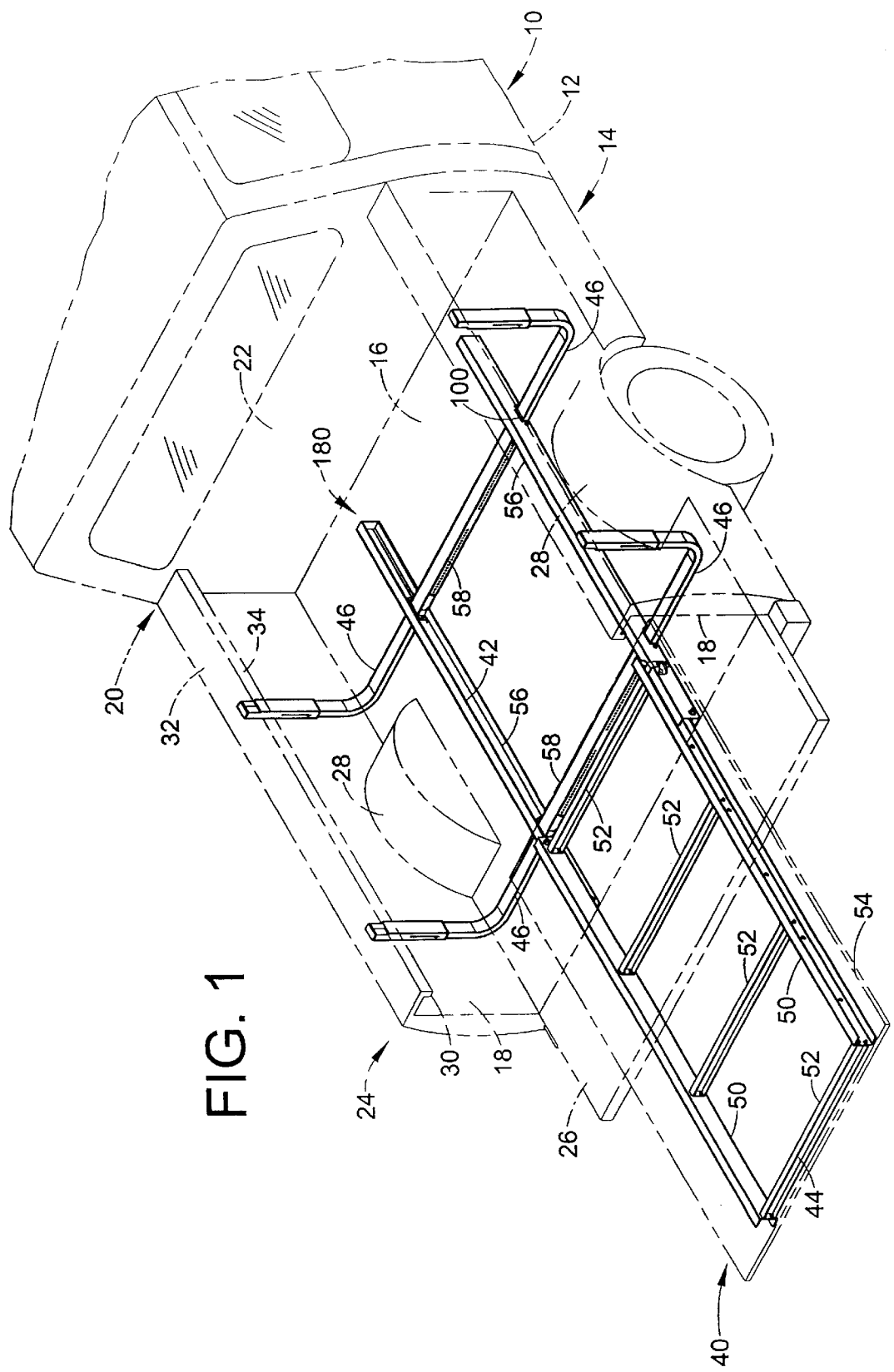
FIG. 1 is a perspective view of a cargo deck in accordance with the present invention, installed in the bed of a pickup truck shown in phantom lines, with a carriage of the cargo deck shown in an extended position.

Referring initially to FIG. 1, a pickup truck 10 generally includes a cab 12 for transporting passengers and a cargo bed 14 (also interchangeably referred to as a cargo box) behind the cab for hauling cargo. The cargo bed includes a horizontal floor 16 (which would be the floor of a bed liner if a bed liner is used in the cargo bed) for supporting the cargo and opposed side walls 18 extending upwardly from the floor. The forward end 20 of the cargo bed is typically closed off by the rear wall 22 of the passenger cab, while the rear end 24 of the cargo bed is typically provided with a tailgate 26 that can be swung open and closed. Typically, the tailgate is pivotable about a lower edge to an open position, generally flush with the floor of the cargo bed, to provide an extension thereof. As is often the case, the floor and/or side walls of the cargo bed is/are interrupted by a pair of laterally spaced-apart wheel-well humps 28 that protrude into the cargo bed from the floor and adjacent side walls.

Figure 2:
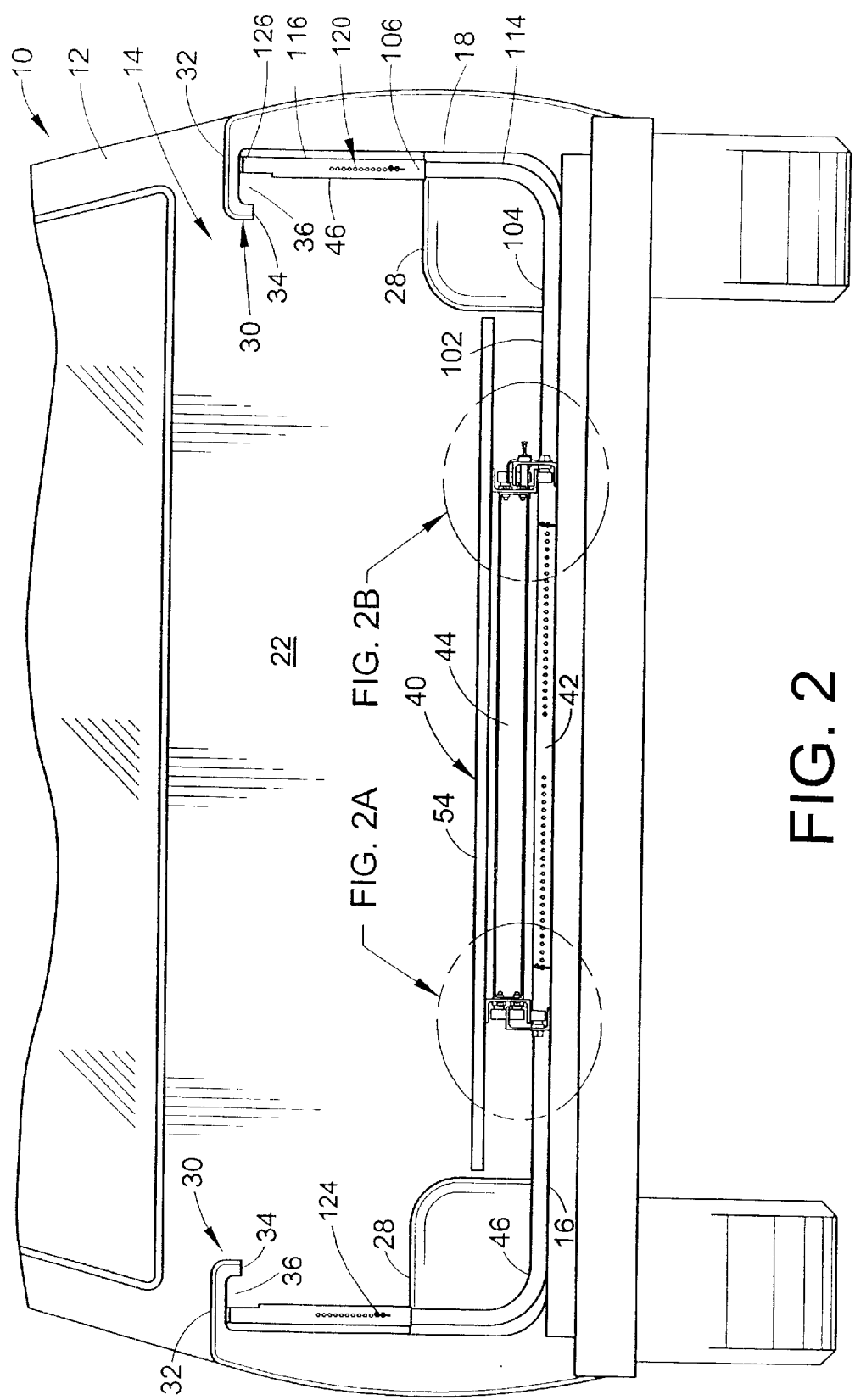
FIG. 2 is a rear end view of the cargo deck shown in FIG. 1.

With additional reference to FIG. 2, each side wall 18 has an inwardly turned side rail 30 at its upper edge. The side rail includes a generally horizontal top wall 32 that extends inwardly over the floor 16 and a downwardly extending lip 34 that may be reversely turned upon itself at its lower edge. The top wall, lip and upper end of the side wall define therebetween an interior space 36.

The foregoing constitutes a general description of a cargo bed with which a cargo deck according to the present invention may be used. It will be appreciated, however, that the cargo deck may be adapted for use with other types of cargo beds, while still utilizing one or more of the principles underlying the present invention.

Figure 3:
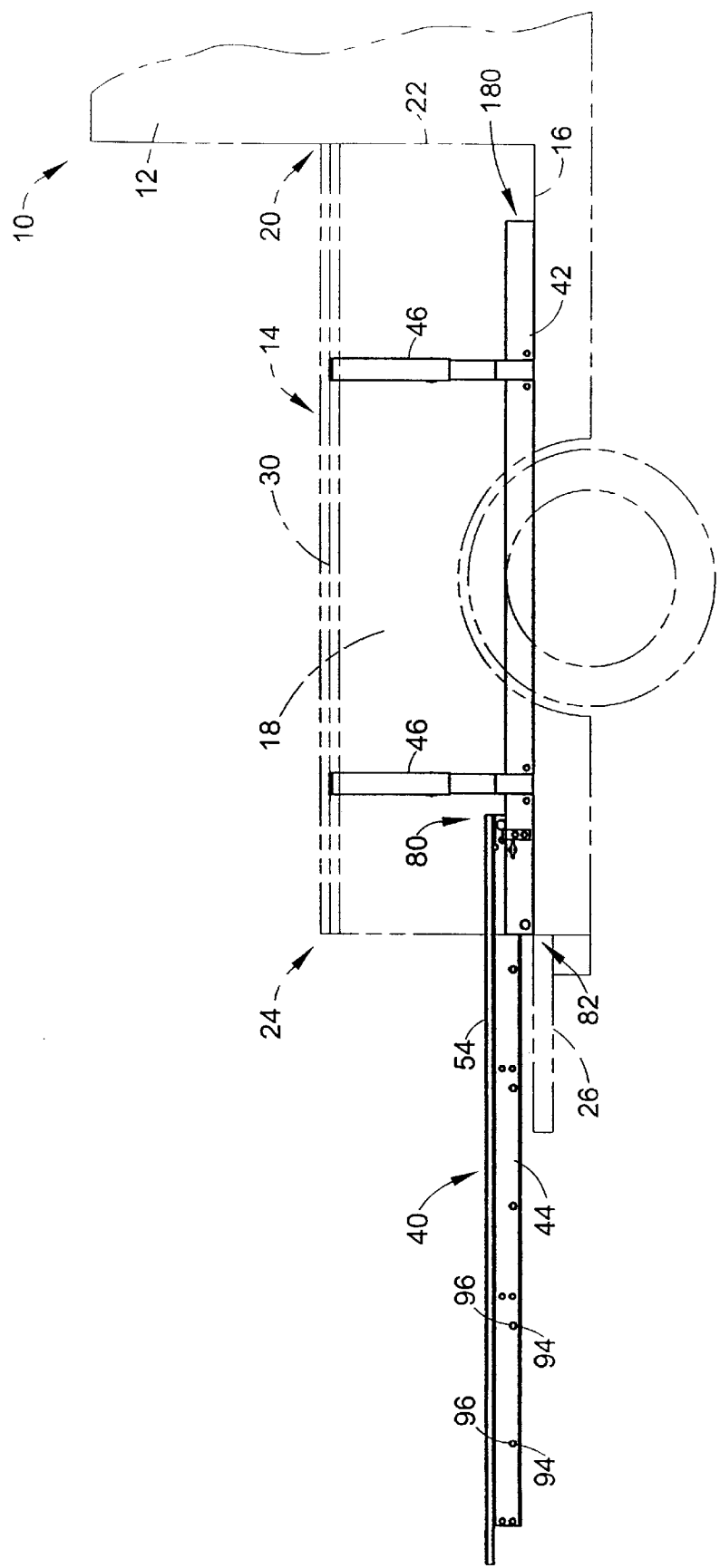
FIG. 3 is a partial side view of the truck and cargo deck shown in FIG. 1.

Referring now to FIGS. 1–4, a portable cargo deck 40 according to the present invention generally comprises a base 42, an extendable carriage 44 and one or more holding devices 46. The extendable carriage is slidably mounted to the base for movement between a stowed or retracted position within the cargo bed 14 and an extended position extending out of the cargo bed (as shown in FIGS. 1 and 3). As illustrated, the carriage may include a pair of side rails 50 interconnected by transverse cross members 52. A sheet, such as a sheet of plywood, for example, may be mounted to a top surface of the carriage to form a platform 54 for supporting the cargo on the carriage. To this end, the carriage may be suitably configured for ready attachment of a platform thereto by suitable means. For example, the side rails and/or cross members may be provided with holes for screws used to secure the platform to the carriage. In addition, the carriage and platform may be formed as a unitary piece, with the top surface of the carriage forming the platform. The platform also could be configured with holddowns or mounts for equipment, and could be interchanged with different platforms depending on the job. The carriage also may have collapsible support legs mounted to the carriage and/or the platform to support the rear end of the carriage in the extended position.

In the illustrated embodiment, the side rails 50 of the carriage 44 also function as inner rails 50 of a roller suspension which may be of a type similar to conventional drawer suspensions used in filing cabinets. An outer rail 56 of the suspension is formed by a side rail 56 of the base 42, the base having a pair of side rails interconnected by transverse cross members 58. If desired, one or more intermediate rails may be provided for added strength and additional extension length in a manner similar to filing cabinet suspension systems. Although in the illustrated embodiment the carriage rails 50 function as inner rails and the base rails 56 function as outer rails, this relationship may be reversed, such that the carriage rails function as the outer rails and the base rails function as the inner rails. Rollers 60, 62, 64 are interposed between the inner and outer rails to provide for smooth stable extension and retraction of the carriage with respect to the base.

Figure 2A:
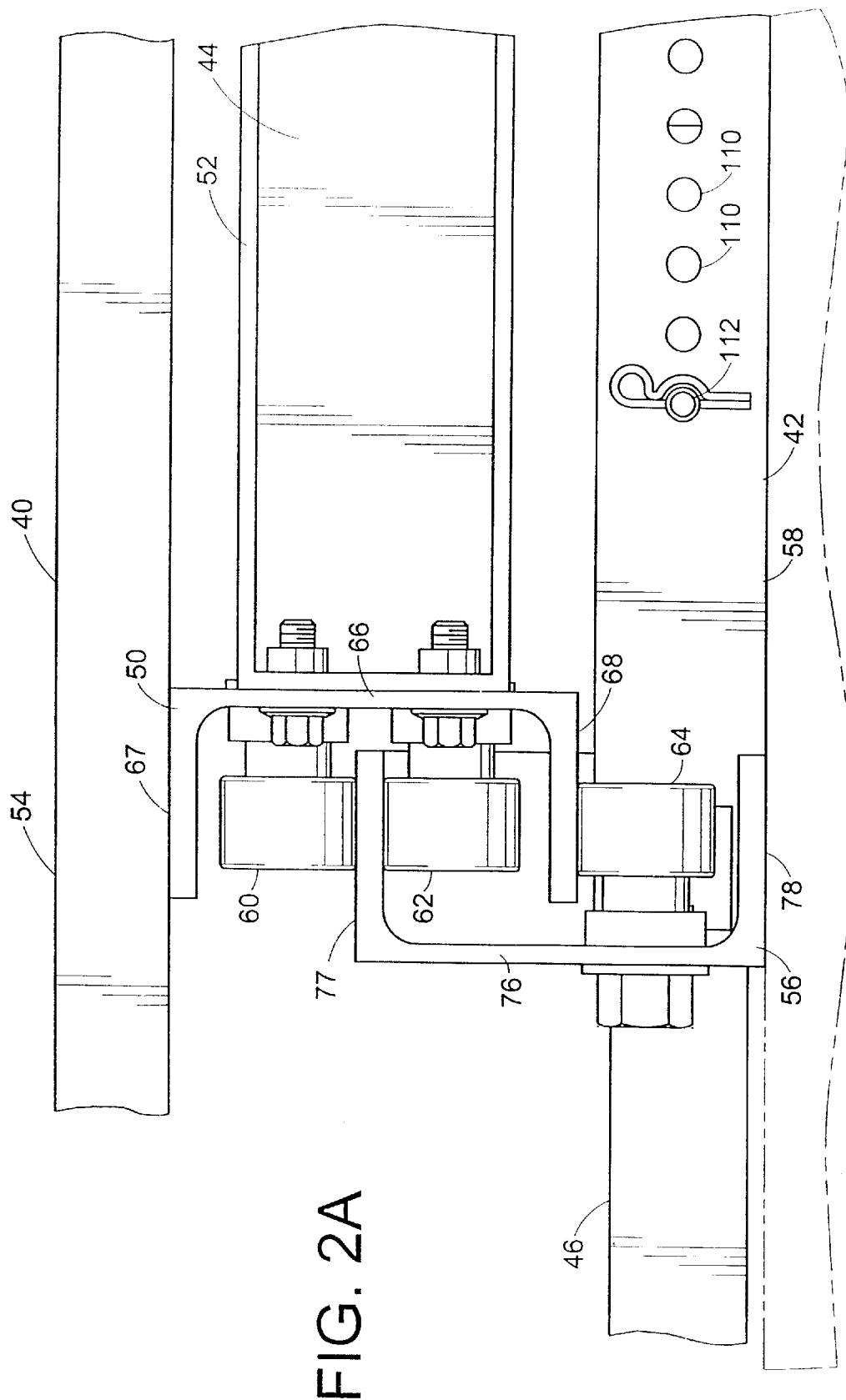
FIG. 2A is an enlarged end view of region 2A of the cargo deck shown in FIG. 2.
Figure 2B:
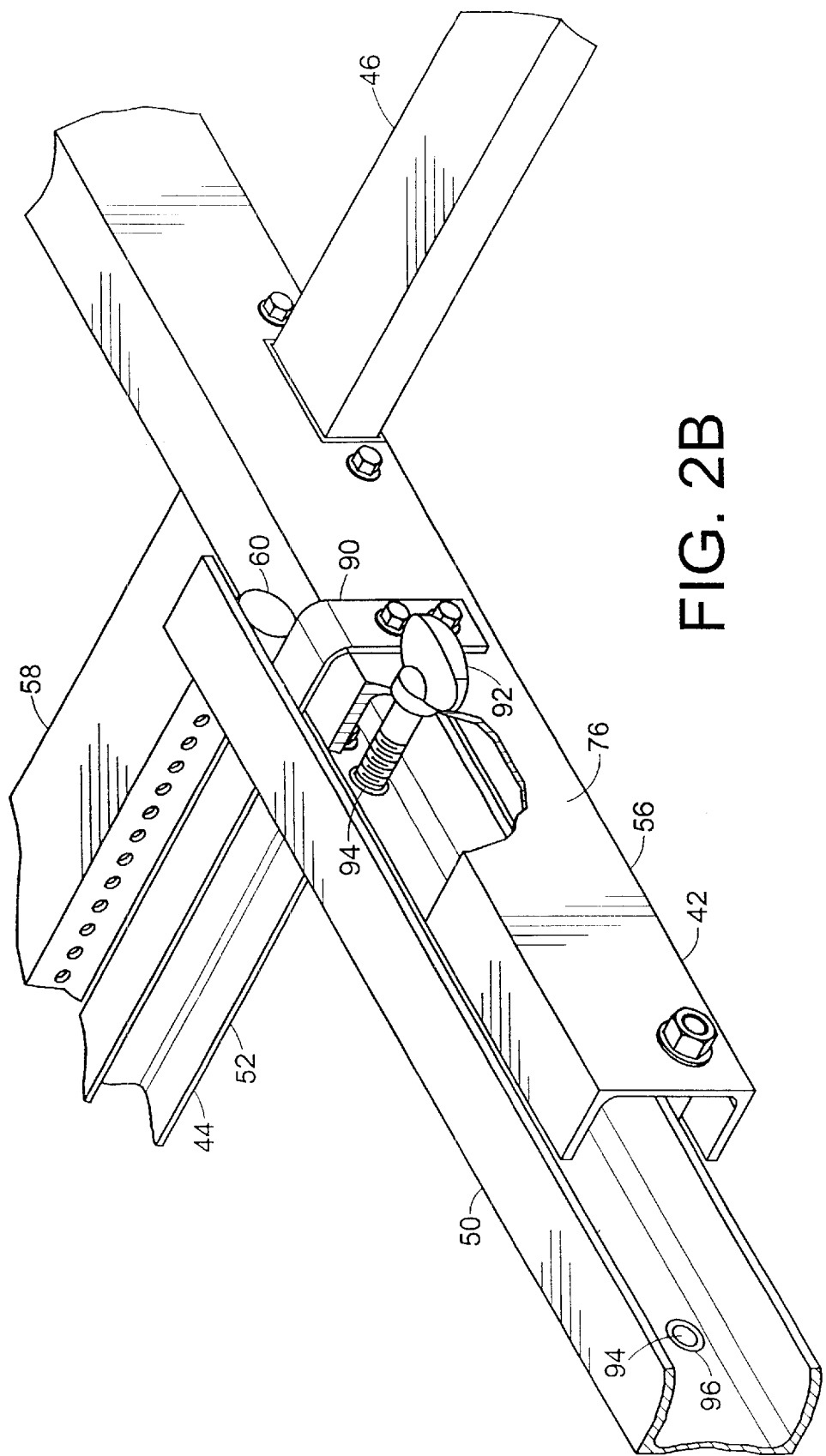
FIG. 2B is an enlarged perspective view of region 2B of the cargo deck shown in FIG. 2, partially broken away to show a stop pin.

Referring specifically to FIGS. 2A and 2B, the inner and outer rails 50, 56 are formed by C-shape channel members having a generally upright base wall 66, 76 and spaced apart upper and lower flanges 67, 68, 77, 78 extending generally perpendicularly from one side of the base wall. The inner and outer rails 50, 56 face each other and interpose the flanges and rollers 60, 62, 64 between the respective base walls. A pair of rollers, the carriage rollers 60, 62, are mounted to the base wall 66 of the inner rail 50 toward a forward end 80 of the carriage 44 and are spaced apart such that a lower roller 62 engages a lower running surface of the upper flange 77 of the outer rail 56, at least when the carriage is in the extended position, and the upper roller 60 engages an upper running surface of the upper flange 77 of the outer rail. Another roller, the base roller 64, is mounted toward a rear end 82 of the base on the base wall 76 of the outer rail. A bottom surface of the lower flange 68 of the inner rail 50 forms a running surface for the base roller 64. Thus the base supports the carriage through the base roller 64 and upper flange 77 of the outer rails 56 which support the carriage rollers 60, 62.

A removable stop 90, formed by an L-shape strap, is mounted to the base wall 76 of at least one of the outer rails 56 and extends inwardly to engage the upper roller 60 on the carriage 44, when the carriage is in the extended position. Thus the stop defines the extended position of the carriage and prevents further extension or removal of the carriage with respect to the base 42.

The base 42 also includes an axially movable locking pin 92 extending through the base wall 76 of the side rail 30 for securing the carriage 44 to the base in at least the retracted position. The corresponding side rail of the carriage includes at least one hole 94 in the base wall 76 thereof for cooperating engagement with the locking pin on the base in a typical pin-and-slot arrangement. The locking pin may be spring-biased toward the hole on the carriage. In the illustrated embodiment, the carriage side rail 50 has a plurality of holes 94 spaced along the length of the side rail that cooperate with the locking pin on the base to secure the carriage in any one of a plurality of positions from the fully retracted position for transport to the fully extended position for loading and unloading. Each opening includes a fitting 96 that provides a stronger connection and more precise receipt of the locking pin therein. The locking pin and the fitting may be threaded to cooperatively secure the locking pin in the fitting.

Returning to FIGS. 1, 2, 3 and 4, when installed the base 42 rests against the floor 16 of the cargo bed 14 and is held in place by the holding devices 46. The holding devices help the base maintain contact with the floor of the truck 10 and hold it in position without requiring any special tools to install or adjust, and without damaging the surfaces of the cargo bed. When the carriage 44 is in the extended position, the holding devices counteract the force of gravity acting on the extended carriage and prevent the cargo deck 40 from tipping over by transmitting a reaction force to the side rails 30.

In the illustrated embodiment, the base 42 includes two tubular cross members 58 aligned with apertures 100 in the outer rails 56 for telescopic receipt of the holding devices 46. The holding devices preferably are arranged in longitudinally spaced and laterally aligned pairs to enhance their ability to hold the base within the cargo bed 14. The longitudinal spacing of the holding devices preferably is selected to clear any wheel-well humps 28 in the cargo bed. Although in the illustrated embodiment the cross members perform a structural function and interconnect the side rails 58, as well as holding the holding devices with respect to the base, these functions could be performed by separate cross members.

Each of the illustrated holding devices 46 includes an L-shape holder 102 having a lower arm 104 that is telescopically received in the tubular cross members 58 of the base 42 and an upright upper arm 106 extending at a right angle to the lower arm. More particularly, the upper arm of the holder extends in a direction perpendicular to the planar extent of the base. The holders may be formed from bar stock bent into the shape of an "L".

The lower arm 104 of each holder 102 has a locking hole 108 in a side thereof, and each of the cross members 58 includes an array of adjustment holes 110 in a side thereof. To adjust the lateral position of the holder, the locking hole is aligned with an adjustment hole, and a locking pin 112 is inserted therethrough to secure the holder in the desired position. In this manner, the holder can be laterally adjusted to locate the upright upper arm 106 with respect to the outer rail 56 of the base 42. Alternatively, each cross member of the base could be formed of a pair of telescopically connected members secured to respective side rails. The side rails would then be movable with respect to each other to adjust the lateral spacing therebetween. In this configuration, the holders may be fixed to and integral with the base, with the laterally adjustable side rails providing lateral adjustment for the holders.

The upright upper arm 106 of each holder 102 also is vertically adjustable to engage the side rail 30. To this end, the illustrated upright arm is composed of upper and lower parts 114, 116 which are telescopically interconnected. The upper or gripper part 116 is telescopically received on the lower part 114, and is adjustable in the same manner as the lower arm 104 is adjustable with respect to the outer rail 56. In other words, the gripper part has an array of holes 120 that can be aligned with a locking hole 122 in the lower part 114 of the upright arm and pinned with a locking pin 124 to secure the gripper part in position.

When installed, the gripper part 116 preferably is extendable as far as the side rail 30 will permit. More preferably, the gripper part is extendable to engage the lip 34 of the side rail and/or the underside of the top wall 32 of the side rail. The distal end of the gripper part has a resilient face 126, formed of a rubber pad secured thereto, for example, to maintain contact with the side rail and to minimize marring of the side rail. The gripper part also has a notch on an inwardly facing surface thereof extending from the distal end of the gripper part to fit more easily in side rails having a smaller opening to the interior space 36, particularly where the lip of the side rail extends substantially inwardly toward the side wall. It should also be noted that some bed liners may block access to the side rails. If such a bed liner is used, holes may have to be opened through the bed liner for the gripper part to extend therethrough to engage the side rail.

Figure 5:
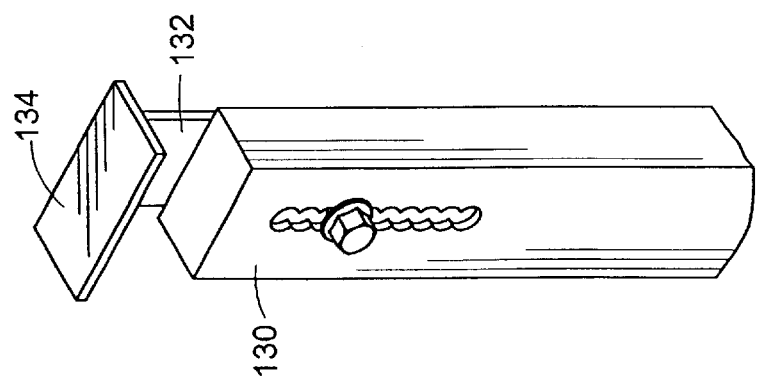
FIG. 5 is a partial perspective view of an alternative holding device in accordance with the present invention.

Alternative upright arm portions and associated gripper parts are shown in FIGS. 5–8. In FIG. 5, the upright arm 130 is substantially the same as described above, with the difference being that the gripper part 132 is connected to a side of the upright arm, and the gripper part 132 is formed of a bar having a plate 134 at the distal end to engage a side rail (not shown).

Figure 6:
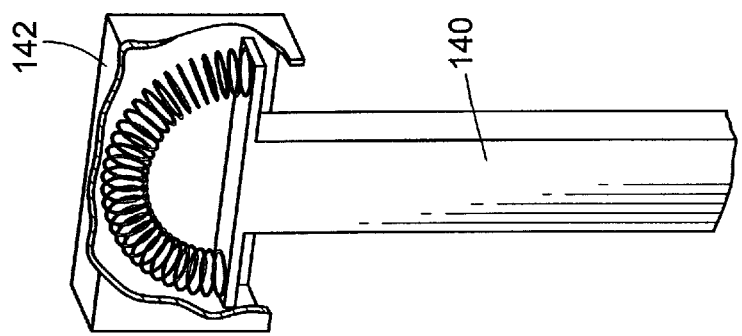
FIG. 6 is a partial perspective view of another alternative holding device in accordance with the present invention partially broken away.

In FIG. 6, the gripper part 140 has a box-like extension 142 that is spring-biased to an extended position to maintain contact with a side rail (not shown). The gripper part may be separately adjustable with respect to the upright arm, as in the above-described embodiments, or the gripper part may be integral with a distal end of the upright arm. In the latter case, the box-like extension can be retracted against the spring bias to move the gripper part under the lip of the side rail.

Figure 7:
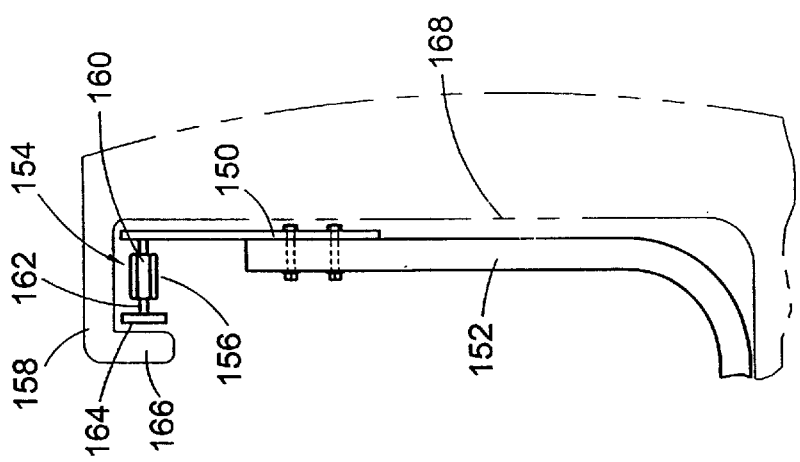
FIG. 7 is a partial end view of yet another alternative holding device in accordance with the present invention, shown installed in a portion of a side rail of a pickup truck.

In FIG. 7, the gripper part 150 extends from the distal end of the upright arm 152 and has a threaded fitting 154 that is received within the interior space 156 of a side rail 158. The fitting has a nut 160 into which is threaded a screw 162 having a swivel plate 164 on an end thereof to engage the inside surface of the lip 166 of the side rail and wedge the fitting between the lip of the side rail and the upper end of the side wall 168. In other words, the fitting functions similar to a turnbuckle.

Figure 8:
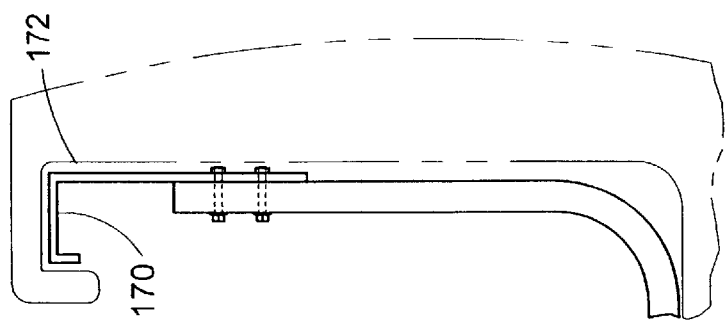
FIG. 8 is a partial end view of still another alternative holding device in accordance with the present invention, shown installed in a portion of a side rail of a pickup truck.

In FIG. 8, the gripper part 170 is formed of a resilient material, such as spring steel, that is received within and roughly parallels the cross-sectional shape of the side rail 172. In each embodiment, the gripper part engages the side rail to reactively urge the cargo deck base against the floor of the cargo bed of the truck.

Turning to FIG. 4, each of the base 42, the carriage 44 and the holding devices 46 are substantially planar, thereby providing an additional advantage in shipping the cargo deck 40. The carriage can be removed or secured in the retracted position, the holding devices can be removed from the base and the entire assembly can be packed in a substantially flat container to facilitate shipping and reduce the costs associated therewith.

As previously indicated, it is often desirable to also attach a flat surface, such as a sheet of plywood, to the top of the carriage 44 to provide a platform 54 for supporting cargo. Because the end user can purchase this component locally, it does not have to be shipped and further reduces the weight and the cost associated with shipping the cargo deck 40 to the end user.

Figure 9:
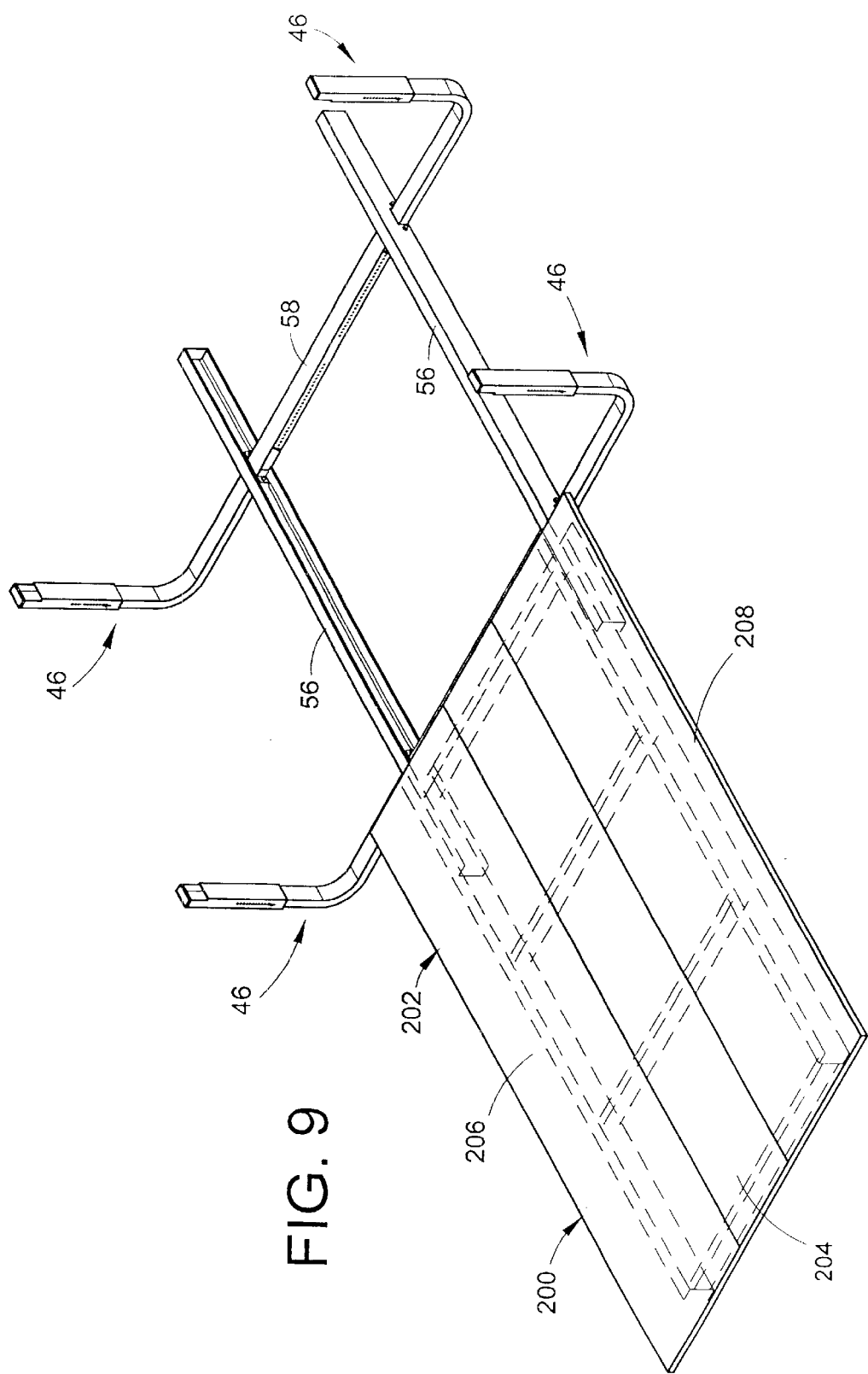
FIG. 9 is a perspective view of an alternative cargo deck in accordance with the present invention having a segmented platform.

An alternative cargo deck 200 is shown in FIG. 9 that is substantially similar to the cargo deck 40 (FIG. 1) (identical parts will be given identical reference numbers), except that this alternative cargo deck 200 includes a segmented platform 202 mounted to the carriage 44. The platform 202 includes a plurality of sections, three sections 204, 206, 208 being shown in the illustrated embodiment, that can be arranged in a coplanar configuration on top of the carriage. The sections may be formed in different sizes that can be combined to provide a variety of total platform sizes. As shown in the illustrated embodiment, the outer sections 204, 208 have the same width, and the inner section 206 has a smaller width, however, all three sections 204, 206, 208 have the same length. Such a composite platform advantageously allows damaged sections to be replaced at lower cost, and allows the platform to be sized to fit in trucks having different bed widths. In addition, the sections can be shipped more easily than a single sheet. The sections can be formed of aluminum sheet metal, and affixed to the carriage with flush counter-sunk screws, for example.

Referring again to FIG. 1, when the cargo deck 40 is received by an end user, the base 42 is placed on the floor 16 of the cargo bed 14 with a forward end 180 thereof adjacent the cab 12 of the truck (as shown in FIG. 1), and the holding devices 46 are telescopically inserted into the base, and more particularly, into the tubular cross members 58. The holders 102 are each laterally adjusted to position the upright arms 106 thereof adjacent the side walls 18 to minimize or eliminate lateral movement of the base with respect to the floor of the cargo bed. The gripper parts 116 of the holders are then adjusted toward, and preferably into engagement with, the side rails 30, and more preferably into engagement with the underside of the top wall 32 of the side rails. Unless the carriage 44 is shipped mounted to the base, the carriage is slidably mounted to the base and the stop 90 is attached to secure the carriage on the base. Thus, the cargo deck constructed in accordance with a preferred embodiment of the present invention can be installed without altering the vehicle. In other words, the cargo deck can be installed while minimizing or eliminating the need to drill holes in the truck 10 and preventing or minimizing damage to the cargo bed liner, if any.

In use, the locking pin 92 is withdrawn from the hole 94 and fitting 96 in the carriage 44, and the carriage is extended to the desired position, or until the upper rollers 60 on the carriage engage the stop when the carriage reaches the extended position. The locking pin 92 can then be aligned with the corresponding hole in the carriage to secure the carriage 44 while it is being loaded or unloaded. The locking pin 92 is then withdrawn once again, and the carriage 44 is retracted with respect to the base 42 to the retracted position, and the locking pin is engaged in the corresponding hole 94 in the carriage to secure the carriage for transport.

Although the portable cargo deck formed in accordance with the present invention is primarily intended for use in a cargo bed, the cargo deck could be used in any vehicle having a potential cargo space with substantially horizontal opposed surfaces comparable to the floor of the cargo bed and the side rail. The aforesaid construction of a cargo deck provides for the installation of the cargo deck without interference with rail-mounted work boxes and/or truck caps, as may be desired. Heavy equipment, such as welders, saws and compressors can be accessed and stowed with significantly less effort, and loading and unloading of the truck bed can be accomplished much more easily. Furthermore, the cargo deck can increase worker productivity by allowing access to the truck bed cargo volume quickly and conveniently, thereby reducing the human performance barrier caused by fatigue and ergonomically stressful motions/positions. The cargo deck may have a wide variety of applications, including use in delivery trucks, as tool supports for the construction trades, general use by a handyman, etc. The cargo deck also may be outfitted with collapsible support legs to form a temporary work table.

In addition, the cargo deck can be installed in a relatively short time, on the order of minutes, without special tools or prior knowledge of trucks. The components of the cargo deck also are lightweight, and can be installed and used by both men and women. Despite its light weight, the cargo deck is very strong and generally may be capable of handling loads near the duty-rating of the truck.

Although the invention has been shown and described with respect to a certain illustrated embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiments of the invention.

What is claimed is:

1. A cargo deck for a cargo bed bounded by side walls having inwardly projecting rails spaced above a floor of the cargo bed, the cargo deck comprising a base for resting atop the floor of the cargo bed, and a carriage mounted to the base for movement between retracted and extended positions with respect to the base, a plurality of holding devices extending from opposite sides of the base for engaging respective side wall rails of the cargo bed for holding the base within the cargo bed, each holding device being laterally adjustable relative to the base.

2. A cargo deck as set forth in claim 1, wherein the holding devices form laterally aligned pairs of holding devices on opposite sides of the base.

3. A cargo deck as set forth in claim 1, wherein the holding device includes an L-shape holder having a lower arm connected to the base and an upright arm extending at substantially a right angle from the lower arm.

4. A cargo deck as set forth in claim 3, wherein the holder is detachably connected to the base.

5. A cargo deck as set forth in claim 3, further comprising a resilient member mounted at the distal end of the upright arm for engaging the side wall rail.

6. A cargo deck as set forth in claim 1, wherein the holding device includes a holder that is adjustable with respect to the base.

7. A cargo deck as set forth in claim 6, wherein the holder is laterally adjustable with respect to the base.

8. A cargo deck as set forth in claim 6, wherein the holder is adjustable in a direction perpendicular to the direction of lateral adjustment relative to the base to engage the side wall rail.

9. A cargo deck as set forth in claim 6, wherein a gripper part at a distal end of the holder is adjustable in a direction perpendicular to the direction of lateral adjustment relative to the base to engage the side wall rail.

10. A cargo deck as set forth in claim 6, further comprising a resilient member mounted to a distal end of the holder.

11. A cargo deck as set forth in claim 6, wherein the interface between the holder and the base includes a pin and hole arrangement for securing the holding device in at least one position.

12. A cargo deck as set forth in claim 11, wherein the interface between the holder and the base includes a pin and hole arrangement for securing the holding device in any one of a plurality of positions.

13. A truck including a cargo deck for a cargo bed bounded by side walls having inwardly projecting rails spaced above a floor of the cargo bed, the cargo deck comprising a base for resting atop the floor of the cargo bed, and a carriage mounted to the base for movement between retracted and extended positions with respect to the base, a plurality of holding devices extending from opposite sides of the base and adjustable relative to the base for engaging respective side wall rails of the cargo bed to hold the base within the cargo bed, wherein the base rests on the bed of the truck and the holding devices engage the side wall rails.

14. A cargo deck for a cargo bed bounded by side walls having inwardly projecting rails spaced above a floor of the cargo bed, the cargo deck comprising a base for resting atop the floor of the cargo bed, and a carriage mounted to the base for movement between retracted and extended positions with respect to the base, a plurality of holding devices extending from opposite sides of the base for engaging respective side wall rails of the cargo bed for holding the base within the cargo bed, each holding device including an L-shape holder having a lower arm telescopically movable with respect to the base and an upright arm extending at substantially a right angle from the lower arm for engaging a side wall rail.

15. A cargo deck as set forth in claim 14, wherein the upright arm includes a lower portion and a gripper portion telescopically movable with respect to the lower portion for engaging the side wall rail.

16. A cargo deck as set forth in claim 14, further comprising a resilient member mounted at the distal end of the gripper portion for engaging the side wall rail.

17. A cargo deck as set forth in claim 1, further comprising a substantially planar platform mounted to an upper surface of the carriage.

18. A cargo deck as set forth in claim 17, wherein the platform includes a plurality of sections, and at least one section has a different size than at least one other section.

19. A cargo deck as set forth in claim 1, wherein each holding device has a width dimension transverse to an L-shape cross-section that is no greater than at least one of a height of a side rail of the base and a combined height of a side rail of the carriage and the height of the side rail of the base.

20. A cargo deck as set forth in claim 1, wherein in an assembled configuration the holding devices are detachable from the base and can be received within a volume defined by the base and the carriage, so that the combined extent of the cargo deck can be shipped in a relatively flat volume.

* * * * *